US006382086B1

United States Patent
Roberts

(10) Patent No.: US 6,382,086 B1
(45) Date of Patent: May 7, 2002

(54) ROTISSERIE OVEN AND COOKING PLATE COMBINATION

(76) Inventor: Richard F. Anthony Roberts, P.O. Box CR #54583, Nassau (BS)

(*) Notice: Subject to any disclaimer, the term of this patent is extended or adjusted under 35 U.S.C. 154(b) by 68 days.

(21) Appl. No.: 09/904,767

(22) Filed: Jul. 13, 2001

(51) Int. Cl.[7] .............. A23L 1/00; A47J 37/00; A47J 37/04; A47J 37/07
(52) U.S. Cl. .............. 99/331; 99/339; 99/340; 99/357; 99/421 H; 99/448
(58) Field of Search .............. 99/331–333, 339, 99/340, 352, 357, 419–421 V, 444–450, 481, 482; 126/9 R, 25 R; 219/400, 492, 494, 454, 474, 521, 386

(56) References Cited

U.S. PATENT DOCUMENTS

| | | | |
|---|---|---|---|
| 3,126,814 A | * | 3/1964 | Brown .............. 99/421 H |
| 3,812,839 A | | 5/1974 | Helgeson |
| 3,947,657 A | | 3/1976 | Ershler |
| 4,508,095 A | | 4/1985 | Bloechel |
| 4,982,657 A | * | 1/1991 | Ghenic .............. 99/419 X |
| 5,172,628 A | * | 12/1992 | Pillsbury et al. .......... 99/421 A |
| 5,184,540 A | * | 2/1993 | Riccio .............. 126/25 R |
| 5,361,686 A | * | 11/1994 | Koopman .............. 99/446 X |
| 5,367,950 A | * | 11/1994 | Sarich .............. 99/449 X |
| 5,380,986 A | | 1/1995 | Mullen |
| 5,421,318 A | * | 6/1995 | Unruh et al. .............. 126/9 R |
| 5,485,780 A | * | 1/1996 | Koether et al. ......... 219/400 X |
| 5,562,022 A | * | 10/1996 | Schmid et al. .............. 99/419 X |
| 5,715,744 A | * | 2/1998 | Coutant .............. 99/421 R |
| 5,799,569 A | * | 9/1998 | Moreth .............. 99/446 X |
| 5,819,639 A | * | 10/1998 | Spell .............. 99/419 S |
| D406,722 S | | 3/1999 | Benton et al. |
| 5,887,513 A | * | 3/1999 | Fielding et al. .......... 99/421 H |
| 5,921,229 A | | 7/1999 | Blake |

* cited by examiner

Primary Examiner—Timothy F. Simone

(57) ABSTRACT

A rotisserie oven and cooking plate combination for providing a portable oven and cooking plate device including a rotisserie oven with a housing having a plurality of heating elements therein. A motor is mounted on the housing and mechanically coupled to a removable skewer assembly for rotating the skewer assembly. A first cooking plate assembly has a generally rectangular top surface and bottom surface. An edge of the top surface is hingedly coupled to a lateral side wall of the housing. A heating element is mounted on the top surface of the first cooking plate. A plurality of actuators turns the rotisserie oven and the cooking plate assembly on and off. Each of the actuators is operationally coupled to one of the heating elements. A power supply is operationally coupled to the actuators.

7 Claims, 4 Drawing Sheets

ROTISSERIE OVEN AND COOKING PLATE COMBINATION

BACKGROUND OF THE INVENTION

1. Field of the Invention

The present invention relates to cooking devices and more particularly pertains to a new rotisserie oven and cooking plate combination for providing a portable oven and cooking plate device.

2. Description of the Prior Art

The use of cooking devices is known in the prior art. More specifically, cooking devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,921,229; U.S. Pat. No. 3,812,839; U.S. Pat. No. 3,947,657; U.S. Pat. No. 5,380,986; U.S. Pat. No. 4,508,095; and U.S. Des. Patent No. 406,722.

While these devices fulfill their respective, particular objectives and requirements, the aforementioned patents do not disclose a new rotisserie oven and cooking plate combination. The inventive device includes a rotisserie oven including a housing having a plurality of heating elements therein. A motor is mounted on the housing and is operationally coupled to a gear. The gear is mechanically coupled to a removable skewer assembly for rotating the skewer assembly. A first cooking plate assembly has a generally rectangular top surface and bottom surface. An edge of the top surface is hingedly coupled to a first of a pair of lateral side walls of the housing such that the top surface may selectively moved between an abutting position abutting the first lateral side wall and a position orientated generally perpendicular to the first lateral side wall. A heating element is mounted on the top surface of the first cooking plate. A plurality of actuators turns the rotisserie oven and the cooking plate assembly on and off. Each of the actuators is operationally coupled to one of the heating elements. A power supply is operationally coupled to the actuators.

In these respects, the rotisserie oven and cooking plate combination according to the present invention substantially departs from the conventional concepts and designs of the prior art, and in so doing provides an apparatus primarily developed for the purpose of providing a portable oven and cooking plate device.

SUMMARY OF THE INVENTION

In view of the foregoing disadvantages inherent in the known types of cooking devices now present in the prior art, the present invention provides a new rotisserie oven and cooking plate combination construction wherein the same can be utilized for providing a portable oven and cooking plate device.

The general purpose of the present invention, which will be described subsequently in greater detail, is to provide a new rotisserie oven and cooking plate combination apparatus and method which has many of the advantages of the cooking devices mentioned heretofore and many novel features that result in a new rotisserie oven and cooking plate combination which is not anticipated, rendered obvious, suggested, or even implied by any of the prior art cooking devices, either alone or in any combination thereof.

To attain this, the present invention generally comprises a rotisserie oven including a housing having a plurality of heating elements therein. A motor is mounted on the housing and is operationally coupled to a gear. The gear is mechanically coupled to a removable skewer assembly for rotating the skewer assembly. A first cooking plate assembly has a generally rectangular top surface and bottom surface. An edge of the top surface is hingedly coupled to a first of a pair of lateral side walls of the housing such that the top surface may selectively moved between an abutting position abutting the first lateral side wall and a position orientated generally perpendicular to the first lateral side wall. A heating element is mounted on the top surface of the first cooking plate. A plurality of actuators turns the rotisserie oven and the cooking plate assembly on and off. Each of the actuators is operationally coupled to one of the heating elements. A power supply is operationally coupled to the actuators.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new rotisserie oven and cooking plate combination apparatus and method which has many of the advantages of the cooking devices mentioned heretofore and many novel features that result in a new rotisserie oven and cooking plate combination which is not anticipated, rendered obvious, suggested, or even implied by any of the prior art cooking devices, either alone or in any combination thereof.

It is another object of the present invention to provide a new rotisserie oven and cooking plate combination which may be easily and efficiently manufactured and marketed.

It is a further object of the present invention to provide a new rotisserie oven and cooking plate combination which is of a durable and reliable construction.

An even further object of the present invention is to provide a new rotisserie oven and cooking plate combination which is susceptible of a low cost of manufacture with regard to both materials and labor, and which accordingly is then susceptible of low prices of sale to the consuming public, thereby making such rotisserie oven and cooking plate combination economically available to the buying public.

Still yet another object of the present invention is to provide a new rotisserie oven and cooking plate combination which provides in the apparatuses and methods of the prior art some of the advantages thereof, while simultaneously overcoming some of the disadvantages normally associated therewith.

Still another object of the present invention is to provide a new rotisserie oven and cooking plate combination for providing a portable oven and cooking plate device.

Yet another object of the present invention is to provide a new rotisserie oven and cooking plate combination which includes a rotisserie oven including a housing having a plurality of heating elements therein. A motor is mounted on the housing and is operationally coupled to a gear. The gear is mechanically coupled to a removable skewer assembly for rotating the skewer assembly. A first cooking plate assembly has a generally rectangular top surface and bottom surface. An edge of the top surface is hingedly coupled to a first of a pair of lateral side walls of the housing such that the top surface may selectively moved between an abutting position abutting the first lateral side wall and a position orientated generally perpendicular to the first lateral side wall. A heating element is mounted on the top surface of the first cooking plate. A plurality of actuators turns the rotisserie oven and the cooking plate assembly on and off. Each of the actuators is operationally coupled to one of the heating elements. A power supply is operationally coupled to the actuators.

Still yet another object of the present invention is to provide a new rotisserie oven and cooking plate combination that has cooking plates which are movable to a position abutting the housing to provide a compact device.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic back cross-sectional view taken along line 3—3 of FIG. 1 of the present invention.

DESCRIPTION OF THE PREFERRED EMBODIMENT

Figure 1:
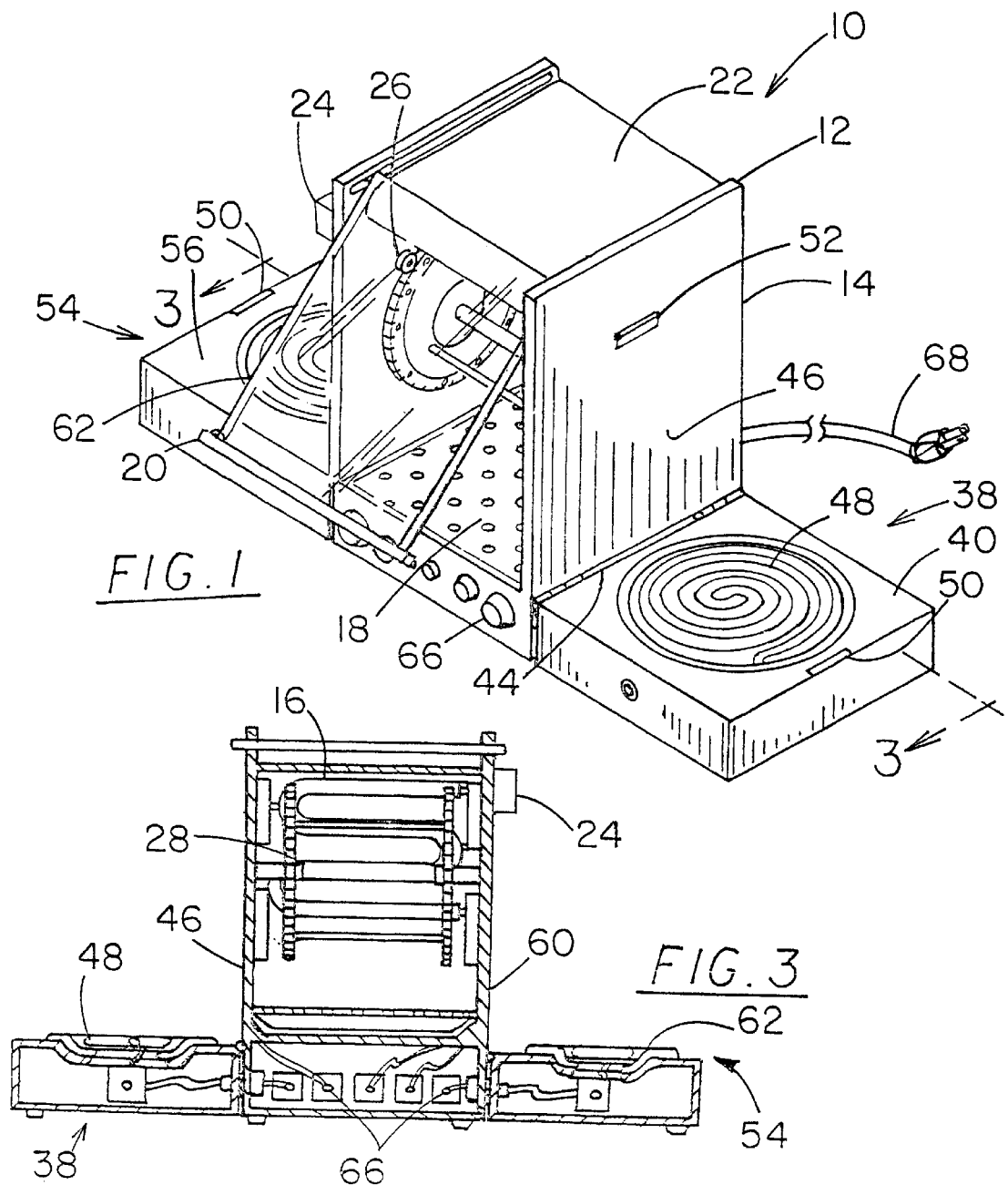
FIG. 1 is a schematic perspective view of a new rotisserie oven and cooking plate combination according to the present invention.
Figure 2:
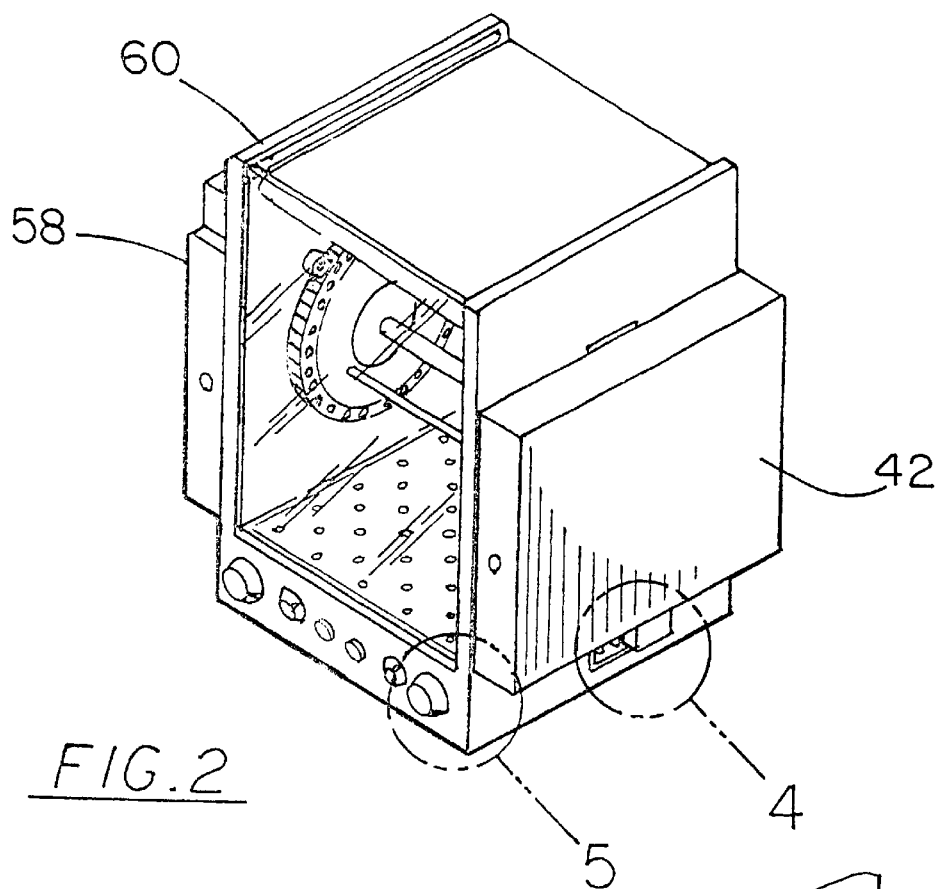
FIG. 2 is a schematic perspective view of the present invention.
Figure 4:
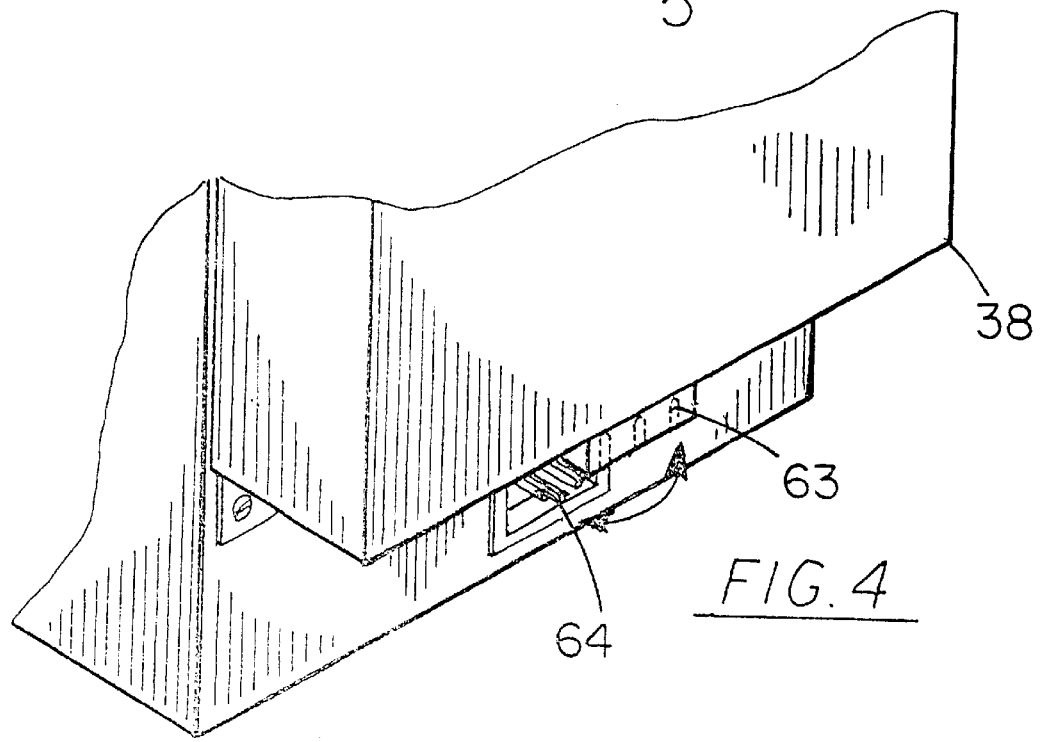
FIG. 4 is a schematic exploded perspective of the electrical coupler view of the present invention.
Figure 5:
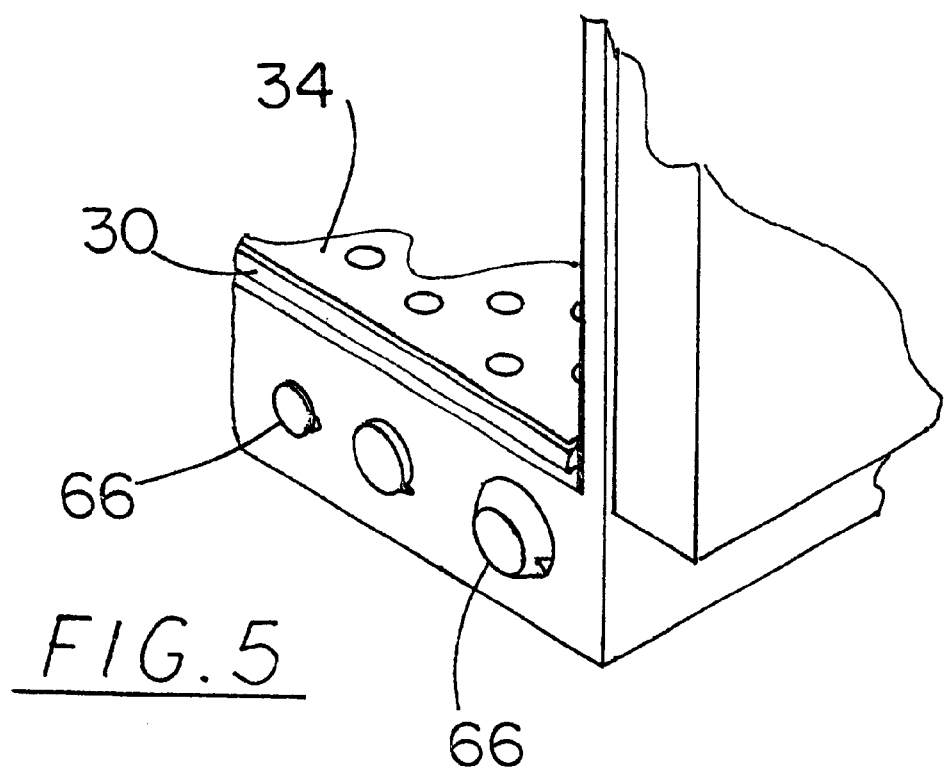
FIG. 5 is a schematic exploded perspective view of the actuators of the present invention.
Figure 6:
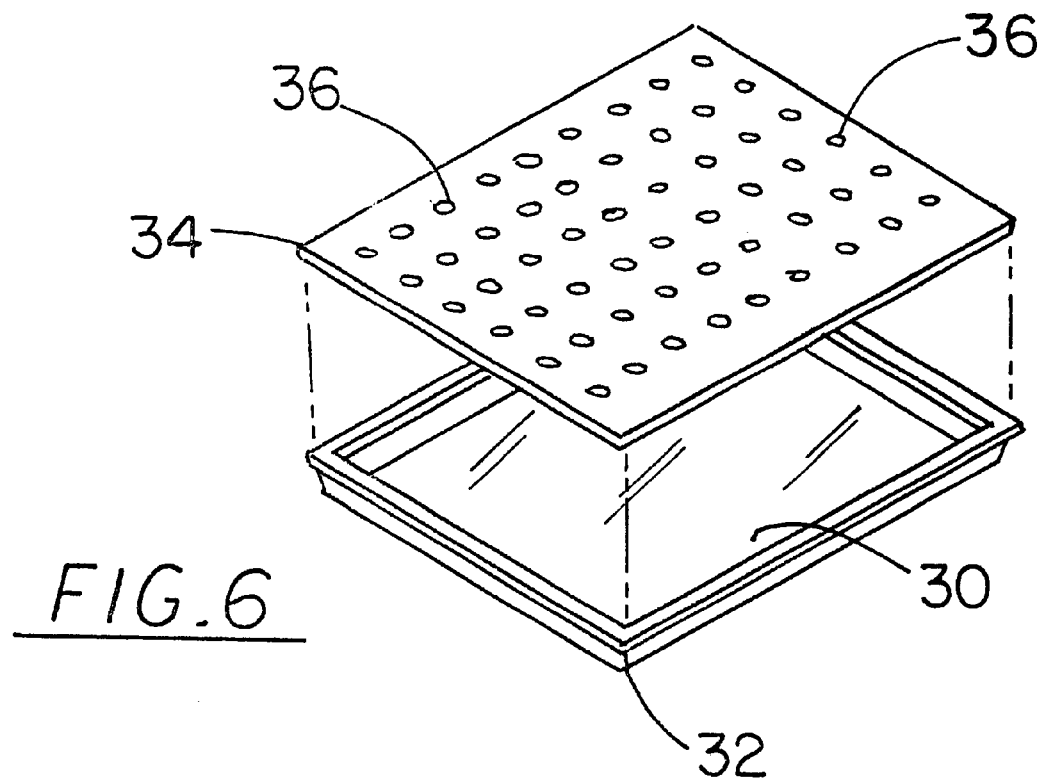
FIG. 6 is a schematic perspective view of a drip pan of the present invention.
Figure 7:
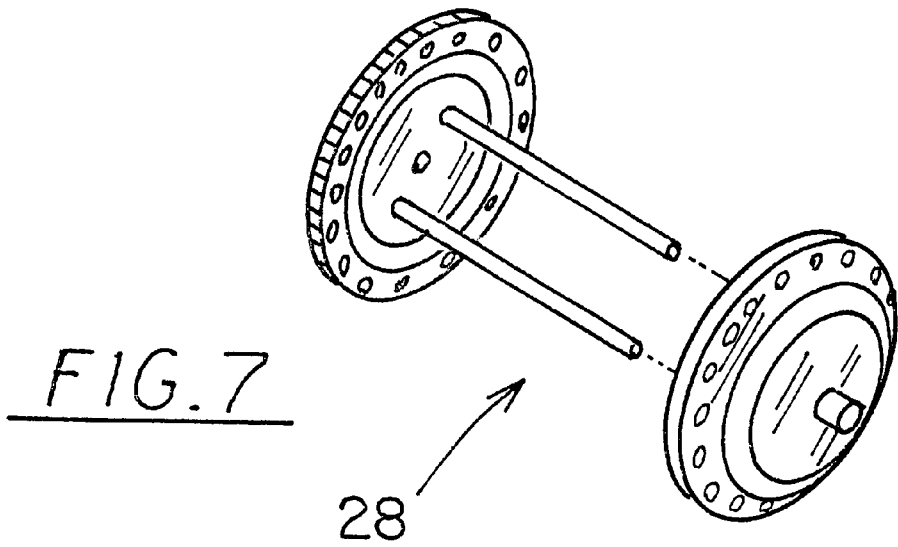
FIG. 7 is a schematic perspective view of a skewer of the present invention.

With reference now to the drawings, and in particular to FIGS. 1 through 7 thereof, a new rotisserie oven and cooking plate combination embodying the principles and concepts of the present invention and generally designated by the reference numeral 10 will be described.

As best illustrated in FIGS. 1 through 7, the rotisserie oven and cooking plate combination 10 generally comprises a rotisserie oven 14 including a housing 14 having a plurality of heating elements 16 therein. The housing 14 has a front side having an opening 18 therein. A door 20 is slidably attached to an upper wall 22 of the housing 14 and is extendable over the opening 18. A motor 24 is mounted on the housing 14 and is operationally coupled to a gear 26. The gear 26 is mechanically coupled to a removable skewer assembly 28 for rotating the skewer assembly 28. The rotisserie oven 12 and the skewer assembly 28 is a conventional rotisserie oven 12 of the kind offered by Ronco Inventions and Regal Ware Incorporated and shown on the Internet and television.

A plate 30 having a peripheral lip 32 is positioned in the housing 14 and is removable from the housing 14. A panel 34 abuts the peripheral lip 32 and generally covers the plate 30. The panel 34 is rigid and has a plurality of apertures 36 extending therethrough. The plate 30 is used as a drip pan for holding oil and grease.

A first cooking plate assembly 38 has a generally rectangular top surface 40 and bottom surface 42. An edge 44 of the top surface 40 is hingedly coupled to a first 46 of a pair of lateral side walls of the housing 14 such that the top surface 42 may selectively moved between an abutting position abutting the first lateral side wall 46 and a position orientated generally perpendicular to the first lateral side wall. A heating element 48 is mounted on the top surface 40 of the first cooking plate 38. A fastening means removably fastens the first cooking plate assembly 38 in the abutting position. The fastening means includes a depression 50 in the top surface 40 and a protruding member 52 attached to the first lateral side wall 46 and positioned for extending into and frictionally engaging the depression 50.

A second cooking plate assembly 54 is generally identical to the first cooking plate and has a generally rectangular top surface 56 and bottom surface 58. An edge of the top surface 56 of the second cooking plate assembly 54 is hingedly coupled to a second 60 of the pair of lateral side walls of the housing such that the top surface 56 may selectively moved between an abutting position abutting the second lateral side wall 60 and a position orientated generally perpendicular to the second lateral side wall 60. A heating element 62 is mounted on the top surface 56 of the second cooking plate 54. A fastening means removably fastens the second cooking plate assembly 54 in the abutting position. The fastening means includes a depression 50 in the top surface 56 of the second cooking plate 54 and a protruding member 52 attached to the second lateral side wall 60 and positioned for extending into and frictionally engaging the depression 50 in the second cooking plate 54. Each of the cooking plates 38, 54 have a female plug 63 which is adapted for receiving one of a pair of male plugs 64 on the housing 14 such that the cooking plates 38, 54 are disconnected from a power supply when the cooking plates are abutted against the housing 14 of the oven 12. The cooking plate assemblies are hot plate type devices.

A plurality of actuators 66 is used for turning the rotisserie oven 12 and the cooking plate assemblies 38, 54 on and off. Each of the actuators 66 is operationally coupled to one of the heating elements 16, 48, 62. The actuators coupled to the heating elements are adapted for selectively increasing the temperature of the heating elements in increments between an off position and a high position. One of the actuators 66 is operationally coupled to the motor 24 for turning the motor on or off.

A power supply 68 is operationally coupled to the actuators 66. The power supply 68 comprises an electrical cord having a male plug thereon.

In use, the device 10 is used as a portable cooking device which offers a rotisserie oven 12 for cooking a chicken or meat while the cooking plate assemblies may be used for cooking items in a pot or other container. The skewer 28 may be removed for and the rotisserie oven used as conventional oven.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A portable heating and cooking device comprising:
    a rotisserie oven including a housing having a plurality of heating elements therein;
    a motor being mounted on said housing and being operationally coupled to a gear, said gear being mechanically coupled to a removable skewer assembly for rotating the skewer assembly;
    a first cooking plate assembly having a generally rectangular top surface and bottom surface, an edge of said top surface being hingedly coupled to a first of a pair of lateral side walls of said housing such that said top surface may selectively moved between an abutting position abutting said first lateral side wall and a position orientated generally perpendicular to said first lateral side wall, a heating element being mounted on said top surface of said first cooking plate;
    a plurality of actuators for turning said rotisserie oven and said cooking plate assembly on and off, each of said actuators being operationally coupled to one of said heating elements; and
    a power supply being operationally coupled to said actuators.

2. The portable heating and cooking device as in claim 1, further including a plate having a peripheral lip being positioned in said housing and being removable from said housing, a panel being abutting said peripheral lip and generally covering said plate, said panel being rigid and having a plurality of apertures extending therethrough.

3. The portable heating and cooking device as in claim 1, further including a fastening means removably fastens said first cooking plate assembly in said abutting position.

4. The portable heating and cooking device as in claim 3, wherein said fastening means includes a depression in said top surface and a protruding member attached to said first lateral side wall and positioned for extending into and frictionally engaging said depression.

5. The portable heating and cooking device as in claim 1, further including:
    a second cooking plate assembly having a generally rectangular top surface and bottom surface, an edge of said top surface of said second cooking plate assembly being hingedly coupled to a second of said pair of lateral side walls of said housing such that said top surface may selectively moved between an abutting position abutting said second lateral side wall and a position orientated generally perpendicular to said second lateral side wall, a heating element being mounted on said top surface of said second cooking plate, on of said actuators being operationally coupled to said heating element of said second cooking plate.

6. The portable heating and cooking device as in claim 5, further including a fastening means removably fastens said first cooking plate assembly in said abutting position, a fastening means removably fastens said second cooking plate assembly in said abutting position.

7. A portable heating and cooking device comprising:
    a rotisserie oven including a housing having a plurality of heating elements therein, said housing having a front side having an opening therein, a door being slidably attached to an upper wall of said housing and being extendable over said opening;
    a motor being mounted on said housing and being operationally coupled to a gear, said gear being mechanically coupled to a removable skewer assembly for rotating the skewer assembly;
    a plate having a peripheral lip being positioned in said housing and being removable from said housing, a panel being abutting said peripheral lip and generally covering said plate, said panel being rigid and having a plurality of apertures extending therethrough;
    a first cooking plate assembly having a generally rectangular top surface and bottom surface, an edge of said top surface being hingedly coupled to a first of a pair of lateral side walls of said housing such that said top surface may selectively moved between an abutting position abutting said first lateral side wall and a position orientated generally perpendicular to said first lateral side wall, a heating element being mounted on said top surface of said first cooking plate, a fastening means removably fastens said first cooking plate assembly in said abutting position, said fastening means including a depression in said top surface and a protruding member attached to said first lateral side wall and positioned for extending into and frictionally engaging said depression;
    a second cooking plate assembly having a generally rectangular top surface and bottom surface, an edge of said top surface of said second cooking plate assembly being hingedly coupled to a second of said pair of lateral side walls of said housing such that said top surface may selectively moved between an abutting position abutting said second lateral side wall and a position orientated generally perpendicular to said second lateral side wall, a heating element being mounted on said top surface of said second cooking plate, a fastening means removably fastens said second cooking plate assembly in said abutting position, said fastening means including a depression in said top surface of said second cooking plate and a protruding member attached to said second lateral side wall and positioned for extending into and frictionally engaging said depression in said second cooking plate;

a plurality of actuators for turning said rotisserie oven and said cooking plate assemblies on and off, each of said actuators being operationally coupled to one of said heating elements, one of said actuators being operationally coupled to said motor; and a power supply being operationally coupled to said actuators, said power supply comprising an electrical cord having a male plug thereon.

\* \* \* \* \*